(12) United States Patent
Davis et al.

(10) Patent No.: US 11,763,004 B1
(45) Date of Patent: Sep. 19, 2023

(54) SYSTEM AND METHOD FOR BOOTKIT DETECTION

(71) Applicant: FireEye, Inc., Milpitas, CA (US)

(72) Inventors: Andrew Davis, Doylestown, PA (US); Frederick House, Glen Ridge, NJ (US); Ryan Fisher, Omaha, NE (US)

(73) Assignee: FireEye Security Holdings US LLC, San Jose, CA (US)

( * ) Notice: Subject to any disclaimer, the term of this patent is extended or adjusted under 35 U.S.C. 154(b) by 1,317 days.

(21) Appl. No.: 16/144,781

(22) Filed: Sep. 27, 2018

(51) Int. Cl.
*G06F 21/57* (2013.01)
*G06F 21/56* (2013.01)

(52) U.S. Cl.
CPC ............ *G06F 21/575* (2013.01); *G06F 21/566* (2013.01); *G06F 21/577* (2013.01)

(58) Field of Classification Search
CPC ...... G06F 21/575; G06F 21/566; G06F 21/577
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |

(Continued)

FOREIGN PATENT DOCUMENTS

| | | | |
|---|---|---|---|
| GB | 2439806 A | 1/2008 |
| GB | 2490431 A | 10/2012 |

(Continued)

OTHER PUBLICATIONS

"Network Security: NetDetector-Network Intrusion Forensic System (NIFS) Whitepaper", ("NetDetector Whitepaper"), (2003).

(Continued)

*Primary Examiner* — Theodore C Parsons
(74) *Attorney, Agent, or Firm* — Rutan & Tucker, LLP

(57) ABSTRACT

An embodiment of a computerized method for detecting bootkits is described. Herein, a lowest level software component within a software stack, such as a lowest software driver within a disk driver stack, is determined. The lowest level software component being in communication with a hardware abstraction layer of a storage device. Thereafter, stored information is extracted from the storage device via the lowest level software component, and representative data based on the stored information, such as execution hashes, are generated. The generated data is analyzed to determine whether the stored information includes a bootkit.

16 Claims, 7 Drawing Sheets

(56) References Cited

U.S. PATENT DOCUMENTS

| | | | |
|---|---|---|---|
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1* | 1/2013 | Parshin et al. ....... G06F 21/575 726/26 |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |

(56) References Cited

U.S. PATENT DOCUMENTS

| | | | |
|---|---|---|---|
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,546 B1 | 5/2017 | Manni et al. | |
| 9,654,485 B1 | 5/2017 | Neumann | |
| 9,661,009 B1 | 5/2017 | Karandikar et al. | |
| 9,661,018 B1 | 5/2017 | Aziz | |
| 9,674,298 B1 | 6/2017 | Edwards et al. | |
| 9,680,862 B2 | 6/2017 | Ismael et al. | |
| 9,690,606 B1 | 6/2017 | Ha et al. | |
| 9,690,933 B1 | 6/2017 | Singh et al. | |
| 9,690,935 B2 | 6/2017 | Shiffer et al. | |
| 9,690,936 B1 | 6/2017 | Malik et al. | |
| 9,736,179 B2 | 8/2017 | Ismael | |
| 9,740,857 B2 | 8/2017 | Ismael et al. | |
| 9,747,446 B1 | 8/2017 | Pidathala et al. | |
| 9,756,074 B2 | 9/2017 | Aziz et al. | |
| 9,773,112 B1 | 9/2017 | Rathor et al. | |
| 9,781,144 B1 | 10/2017 | Otvagin et al. | |
| 9,787,700 B1 | 10/2017 | Amin et al. | |
| 9,787,706 B1 | 10/2017 | Otvagin et al. | |
| 9,792,196 B1 | 10/2017 | Ismael et al. | |
| 9,824,209 B1 | 11/2017 | Ismael et al. | |
| 9,824,211 B2 | 11/2017 | Wilson | |
| 9,824,216 B1 | 11/2017 | Khalid et al. | |
| 9,825,976 B1 | 11/2017 | Gomez et al. | |
| 9,825,989 B1 | 11/2017 | Mehra et al. | |
| 9,830,478 B1* | 11/2017 | Hale | G06F 21/71 |
| 9,838,408 B1 | 12/2017 | Karandikar et al. | |
| 9,838,411 B1 | 12/2017 | Aziz | |
| 9,838,416 B1 | 12/2017 | Aziz | |
| 9,838,417 B1 | 12/2017 | Khalid et al. | |
| 9,846,776 B1 | 12/2017 | Paithane et al. | |
| 9,876,701 B1 | 1/2018 | Caldejon et al. | |
| 9,888,016 B1 | 2/2018 | Amin et al. | |
| 9,888,019 B1 | 2/2018 | Pidathala et al. | |
| 9,910,988 B1 | 3/2018 | Vincent et al. | |
| 9,912,644 B2 | 3/2018 | Cunningham | |
| 9,912,681 B1 | 3/2018 | Ismael et al. | |
| 9,912,684 B1 | 3/2018 | Aziz et al. | |
| 9,912,691 B2 | 3/2018 | Mesdaq et al. | |
| 9,912,698 B1 | 3/2018 | Thioux et al. | |
| 9,916,440 B1 | 3/2018 | Paithane et al. | |
| 9,921,978 B1 | 3/2018 | Chan et al. | |
| 9,934,376 B1* | 4/2018 | Ismael | G06F 21/566 |
| 9,934,381 B1 | 4/2018 | Kindlund et al. | |
| 9,946,568 B1 | 4/2018 | Ismael et al. | |
| 9,954,890 B1 | 4/2018 | Staniford et al. | |
| 9,973,531 B1 | 5/2018 | Thioux | |
| 10,002,252 B2 | 6/2018 | Ismael et al. | |
| 10,019,338 B1 | 7/2018 | Goradia et al. | |
| 10,019,573 B2 | 7/2018 | Silberman et al. | |
| 10,025,691 B1 | 7/2018 | Ismael et al. | |
| 10,025,927 B1 | 7/2018 | Khalid et al. | |
| 10,027,689 B1 | 7/2018 | Rathor et al. | |
| 10,027,690 B2 | 7/2018 | Aziz et al. | |
| 10,027,696 B1 | 7/2018 | Rivlin et al. | |
| 10,033,747 B1 | 7/2018 | Paithane et al. | |
| 10,033,748 B1 | 7/2018 | Cunningham et al. | |
| 10,033,753 B1 | 7/2018 | Islam et al. | |
| 10,033,759 B1 | 7/2018 | Kabra et al. | |
| 10,050,998 B1 | 8/2018 | Singh | |
| 10,068,091 B1 | 9/2018 | Aziz et al. | |
| 10,075,455 B2 | 9/2018 | Zafar et al. | |
| 10,083,302 B1 | 9/2018 | Paithane et al. | |
| 10,084,813 B2 | 9/2018 | Eyada | |
| 10,089,461 B1 | 10/2018 | Ha et al. | |
| 10,097,573 B1 | 10/2018 | Aziz | |
| 10,104,102 B1 | 10/2018 | Neumann | |
| 10,108,446 B1 | 10/2018 | Steinberg et al. | |
| 10,121,000 B1 | 11/2018 | Rivlin et al. | |
| 10,122,746 B1 | 11/2018 | Manni et al. | |

(56) References Cited

U.S. PATENT DOCUMENTS

| | | |
|---|---|---|
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman, III et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe, Jr. et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |

(56) References Cited

U.S. PATENT DOCUMENTS

| | | |
|---|---|---|
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemelä et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0291126 A1* | 11/2012 | Lagar-Cavilla et al. ............ H04W 12/128 726/22 |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1* | 5/2013 | Brinkley et al. ........ G06F 21/54 726/23 |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |

(56) References Cited

U.S. PATENT DOCUMENTS

| | | | |
|---|---|---|---|
| 2013/0191915 | A1 | 7/2013 | Antonakakis et al. |
| 2013/0196649 | A1 | 8/2013 | Paddon et al. |
| 2013/0227691 | A1 | 8/2013 | Aziz et al. |
| 2013/0246370 | A1 | 9/2013 | Bartram et al. |
| 2013/0247186 | A1 | 9/2013 | LeMasters |
| 2013/0263260 | A1 | 10/2013 | Mahaffey et al. |
| 2013/0291109 | A1 | 10/2013 | Staniford et al. |
| 2013/0298243 | A1 | 11/2013 | Kumar et al. |
| 2013/0318038 | A1 | 11/2013 | Shiffer et al. |
| 2013/0318073 | A1 | 11/2013 | Shiffer et al. |
| 2013/0325791 | A1 | 12/2013 | Shiffer et al. |
| 2013/0325792 | A1 | 12/2013 | Shiffer et al. |
| 2013/0325871 | A1 | 12/2013 | Shiffer et al. |
| 2013/0325872 | A1 | 12/2013 | Shiffer et al. |
| 2014/0032875 | A1 | 1/2014 | Butler |
| 2014/0053260 | A1 | 2/2014 | Gupta et al. |
| 2014/0053261 | A1 | 2/2014 | Gupta et al. |
| 2014/0130158 | A1 | 5/2014 | Wang et al. |
| 2014/0137180 | A1 | 5/2014 | Lukacs et al. |
| 2014/0169762 | A1 | 6/2014 | Ryu |
| 2014/0179360 | A1 | 6/2014 | Jackson et al. |
| 2014/0181131 | A1 | 6/2014 | Ross |
| 2014/0189687 | A1 | 7/2014 | Jung et al. |
| 2014/0189866 | A1 | 7/2014 | Shiffer et al. |
| 2014/0189882 | A1 | 7/2014 | Jung et al. |
| 2014/0237600 | A1 | 8/2014 | Silberman et al. |
| 2014/0280245 | A1 | 9/2014 | Wilson |
| 2014/0283037 | A1 | 9/2014 | Sikorski et al. |
| 2014/0283063 | A1 | 9/2014 | Thompson et al. |
| 2014/0328204 | A1 | 11/2014 | Klotsche et al. |
| 2014/0337836 | A1 | 11/2014 | Ismael |
| 2014/0344926 | A1 | 11/2014 | Cunningham et al. |
| 2014/0351935 | A1 | 11/2014 | Shao et al. |
| 2014/0380473 | A1 | 12/2014 | Bu et al. |
| 2014/0380474 | A1 | 12/2014 | Paithane et al. |
| 2015/0007312 | A1 | 1/2015 | Pidathala et al. |
| 2015/0096022 | A1 | 4/2015 | Vincent et al. |
| 2015/0096023 | A1 | 4/2015 | Mesdaq et al. |
| 2015/0096024 | A1 | 4/2015 | Haq et al. |
| 2015/0096025 | A1 | 4/2015 | Ismael |
| 2015/0180886 | A1 | 6/2015 | Staniford et al. |
| 2015/0186645 | A1 | 7/2015 | Aziz et al. |
| 2015/0199513 | A1 | 7/2015 | Ismael et al. |
| 2015/0199531 | A1 | 7/2015 | Ismael et al. |
| 2015/0199532 | A1 | 7/2015 | Ismael et al. |
| 2015/0220735 | A1 | 8/2015 | Paithane et al. |
| 2015/0372980 | A1 | 12/2015 | Eyada |
| 2016/0004869 | A1 | 1/2016 | Ismael et al. |
| 2016/0006756 | A1 | 1/2016 | Ismael et al. |
| 2016/0044000 | A1 | 2/2016 | Cunningham |
| 2016/0127393 | A1 | 5/2016 | Aziz et al. |
| 2016/0191547 | A1 | 6/2016 | Zafar et al. |
| 2016/0191550 | A1 | 6/2016 | Ismael et al. |
| 2016/0196425 | A1* | 7/2016 | Davidov et al. ..... G06F 21/566 726/23 |
| 2016/0261612 | A1 | 9/2016 | Mesdaq et al. |
| 2016/0285914 | A1 | 9/2016 | Singh et al. |
| 2016/0301703 | A1 | 10/2016 | Aziz |
| 2016/0335110 | A1 | 11/2016 | Paithane et al. |
| 2017/0083703 | A1 | 3/2017 | Abbasi et al. |
| 2018/0013770 | A1 | 1/2018 | Ismael |
| 2018/0048660 | A1 | 2/2018 | Paithane et al. |
| 2018/0121316 | A1 | 5/2018 | Ismael et al. |
| 2018/0288077 | A1 | 10/2018 | Siddiqui et al. |
| 2019/0104147 | A1* | 4/2019 | Rouatbi et al. .... H04L 63/1441 |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

"When Virtual is Better Than Real", IEEEXplore Digital Library, available at, http://ieeexplore.ieee.org/xpl/articleDetails.sp?reload=true&amumbe-r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M. I., "PyFlag-An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

(56) References Cited

OTHER PUBLICATIONS

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP01950454 ISBN:978-3-642-15511-6.

Khaled Salah et al.: "Using Cloud Computing to Implement a Security Overlay Network", SECURITY & PRIVACY, IEEE, IEEE SERVICE CENTER, Los Alamitos, CA, US, vol. 11, No. 1, Jan. 1, 2013.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Vladimir Getov: "Security as a Service in Smart Clouds – Opportunities and Concerns", COMPUTER SOFTWARE AND APPLICATIONS CONFERENCE (COMPSAC), 2012 IEEE 36TH annual, IEEE, Jul. 16, 2012.

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

Venezia, Paul, "NetDetector Captures Intrusions", InfoWorld Issue 27, ("Venezia"), (Jul. 14, 2003).

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

"Mining Specification of Malicious Behavior"—Jha et al, UCSB, Sep. 2007 https://www.cs.ucsb.edu/.about.chris/research/doc/esec07.sub.-mining.pdf-.

Gregg Keizer: "Microsoft's HoneyMonkeys Show Patching Windows Works", Aug. 8, 2005, XP055143386, Retrieved from the Internet: URL: http://www.informationweek.com/microsofts-honey monkeys-show-patching-windows-works/d/d-d/1035069? [retrieved on Jun. 1, 2016].

\* cited by examiner

SYSTEM AND METHOD FOR BOOTKIT DETECTION

FIELD

Embodiments of the disclosure relate to the field of cyber security. More specifically, embodiments of the disclosure relate to a system and computerized method for scalable bootkit detection.

GENERAL BACKGROUND

While the cyber threat landscape continues to evolve at an ever-increasing pace, the exploitation of basic input/output system (BIOS) boot processes remains a threat to enterprises around the world. BIOS exploitation may be accomplished by a threat actor using a "bootkit," namely an advanced and specialized form of malware that misappropriates execution early in the boot process, making it difficult to identify within a network device. As a bootkit is designed to tamper with the boot process before operating system (OS) execution, this type of malware is often insidious within a network device, and in some cases, persists despite remediation attempts made by security administrators. Therefore, early detection of bootkit malware is essential in protecting a network device from harm.

Reliable and timely detection of bootkit malware for thousands of network devices operating as part of an enterprise network has been difficult for a variety of reasons, especially surrounding the unreliability and impracticality of reading boot records from computers and other network devices of the enterprise network. There are two types of boot records: a Master Boot Record (MBR) and multiple Volume Boot Records (VBRs). The MBR is the first boot sector located at a starting address of a partitioned, storage device such as a hard disk drive, solid-state component array, or a removable drive. The MBR tends to store (i) information associated with logical partitions of the storage device and (ii) executable boot code that functions as a first stage boot loader for the installed operating system. A VBR is a first boot sector stored at a particular partition on the storage device, which contains the necessary computer code to start the boot process. For example, the VBR may include executable boot code that is initialized by the MBR to begin the actual loading of the operating system.

With respect to the unreliability of reading boot records for malware detection, by their nature, bootkits are notorious for hooking legitimate Application Programming Interface (API) calls in an attempt to hide bytes overwritten in the boot code. As a result, collecting the bytes by reading a disk from user space is unreliable, as a bootkit may be intercepting the reads and returning code that appears to be (but is not) legitimate.

With respect to the impracticality of reading boot records from all network devices of the enterprise network for malware detection, given that compromised enterprise networks may support thousands of network devices and each network device includes multiple boot records, a determination as to whether each network device is infected with a bootkit is quite challenging. Currently, a malware analyst could acquire a disk image and then reverse engineer the boot bytes to determine if any malicious code is present in the boot chain. Performed manually, this analysis would require a large team of skilled analysts, which is not easily scalable and greatly increases the costs in supporting an enterprise network in protecting this network from a bootkit attack.

Ultimately, the problems associated with the conventional review of the boot records for bootkit malware are the following: (1) collection of boot records from the network devices is unreliable; (2) analysis of the boot records is manual only, and does not take into account any behavioral analyses; and (3) inability to analyze thousands or even tens of thousands of boot records in a timely manner without significant costs and resources.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
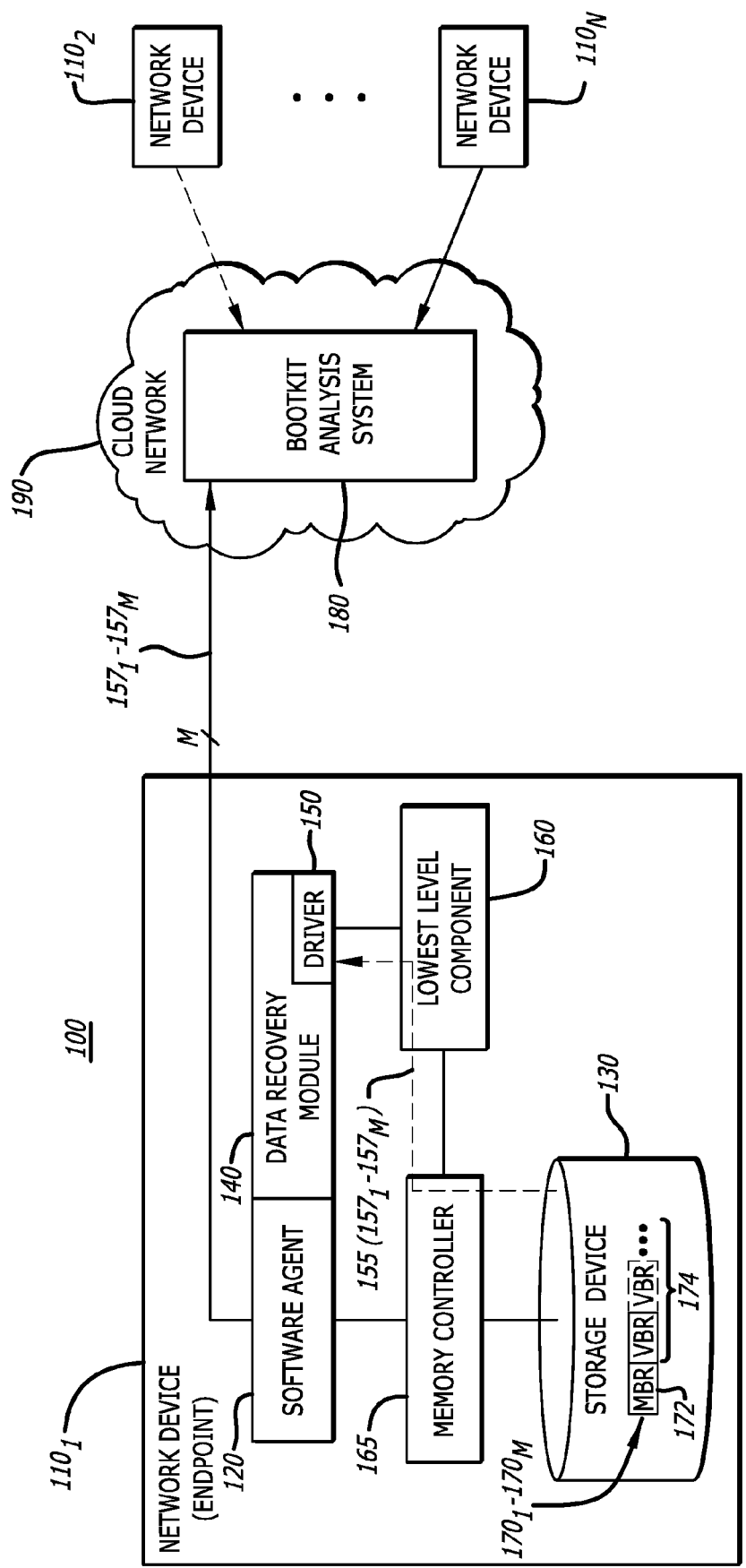
FIG. 1A is a first exemplary block diagram of a cyberattack detection system including deploying a centralized bootkit analysis system adapted to receive extracted data from targeted boot records.

Various embodiments of the disclosure relate to a software module installed to operate with (or as part of) a software agent to assist in the detection of malware and/or attempted cyberattacks on a network device (e.g., endpoint). According to one embodiment of the disclosure, the software module (referred to as a "data recovery module") features a driver that is configured to extract raw data stored in a storage device (e.g., hard disk drive, solid-state component array, or a removable drive, etc.). Thereafter, the extracted raw data is evaluated, such as through simulated processing by emulator logic, and subsequently determined whether a portion of the extracted raw data corresponds to malicious bootstrapping code operating as a bootkit. Herein, the data recovery module may be implemented as code integrated as part of the software agent or may be implemented as software plug-in for the software agent, where the plug-in controls the data extraction from the storage device.

As described below, the data recovery module is configured to obtain information associated with a storage driver stack pertaining to an endpoint under analysis. As an illustrative example, the storage driver stack may correspond to a disk driver stack provided by an operating system (OS) of the endpoint, such as a Windows® OS. Based on this driver stack information, the data recovery module (i) determines a "lowest level" component within the storage driver stack and (ii) extracts data from the storage device via the lowest level component (referred to as "extracted data").

According to one embodiment of the disclosure, the "lowest level" component may correspond to the software driver in direct communication with a controller for the storage device (e.g., a memory controller such as a disk controller). As an illustrative example, the "lowest level" component may be a software driver that does not utilize any other software drivers in the storage (disk) driver stack before communications with a hardware abstraction layer for the storage (disk) device, such as an intermediary controller or the storage device itself.

As described below, the extracted data may include stored information read from at least one boot record maintained by the storage device, such as a Master Boot Record (MBR) and/or a Volume Boot Records (VBR) for example. For example, this read operation may be a single read operation or iterative read operations to extract data from multiple (two or more) or all of the boot records (e.g., MBR and all of the VBRs). The extracted data associated with each boot record may be referred to as a "boot sample." For one embodiment of the disclosure, the boot sample may include the data extracted from the entire boot record. As another embodiment, however, the boot sample merely includes a portion of data within a particular boot record, such as one or more bytes of data that correspond to a piece of code accessed from the boot record.

By directly accessing the lowest level component, the data recovery module bypasses the rest of the storage driver stack, as well as various types of user space hooks, which improves the accuracy and trustworthiness in the boot samples provided for analysis. Alternatively, in lieu of the "lowest level" component, the data recovery module may be configured to access a "low-level" component, namely the lowest level component or a near lowest level component being a software component positioned in close proximity to the hardware to reduce the risk of hijacking and increase the trustworthiness of boot sector data. Hence, a first indicator of compromise (IOC) for detecting a compromised boot system may be based, at least in part, on logic within the software agent or a bootkit analysis system (described below) determining that a boot sample being part of the extracted data is different from data retrieved from the particular boot record via processes running in the user space (i.e., not through direct access via the lowest level component of the storage driver stack). The first IOC may be provided to the bootkit analysis system as metadata or other a separate communication channel (not shown).

Upon receipt of the boot samples from the storage device, the endpoint provides these boot samples to the bootkit analysis system. According to one embodiment, the bootkit analysis system may be implemented locally within the endpoint and is adapted to receive boot samples from one or more remote sources. Alternatively, according to another embodiment of the disclosure and described herein, the bootkit analysis system may be implemented remotely from the endpoint, where the bootkit analysis system may be implemented as (i) a separate, on-premises network device on the enterprise network or (ii) logic within a network device supporting a cloud service provided by a private or public cloud network. For the cloud service deployment, the bootkit analysis system may be adapted to receive the boot samples, and optionally metadata associated with the boot samples (e.g., name of the corresponding boot record, identifier of the software agent, and/or an identifier of the endpoint such as a media access control "MAC" address or an Internet Protocol "IP" address). Herein, for this embodiment, the bootkit analysis system may be further adapted to receive boot samples from multiple software agents installed on different endpoints for use in detecting a potential bootkit being installed in any of these endpoints as well.

Herein, the bootkit analysis system comprises emulator logic that simulates processing of each boot sample, namely data bytes corresponding to boot instructions maintained in the corresponding boot record (e.g., MBR, a particular VBR, etc.), to generate an execution hash associated with these boot instructions. More specifically, as soon as or after the boot samples are collected from the storage device, the software agent (or optionally the data recovery module) provides the boot samples to the emulator logic of the bootkit analysis system. The emulator logic captures the high-level functionality during simulated processing of each of the boot samples, where the high-level functionality includes behaviors such as memory reads, memory writes, and/or other interrupts. Each of these behaviors may be represented by one or more instructions, such as one or more assembly instructions. The assembly instructions may include but are not limited or restricted to mnemonics. A "mnemonic" is an abbreviation (symbol or name) used to specify an operation or function which, according to some embodiments, may be entered in the operation code field of an assembler instruction. Examples of certain mnemonics may include the following: AND (logical "and"), OR (logical "or"), SHL (logical "shift left"), SHR (logical "shift right"), and/or MOV (e.g., logical "move").

During emulation, the emulator logic may be configured to perform a logical operation on the mnemonic of the instructions to produce a data representation, namely the emulator logic is configured to conduct a one-way hash operation on the mnemonic of the instructions, which produces a resultant hash value representative of the boot sample being executed during a boot cycle. The resultant hash value, referred to as an "execution hash," is generated from continued hashing of mnemonics associated with the instructions being determined through the simulated processing of a boot sample by the emulator logic. Hence, according to one embodiment of the disclosure, each execution hash corresponds to a particular boot sample. However, as another embodiment, an execution hash may correspond to hash results of multiple (two or more) boot samples.

Besides the emulator logic, the bootkit analysis system further features de-duplicator logic and classifier logic. The de-duplicator logic receives a set (e.g., two or more) of execution hashes, which are generated by the emulator logic based on the received boot samples, and compares each of these execution hashes to a plurality of execution hashes associated with previously detected boot samples (referred to as "execution hash intelligence"). The execution hash intelligence may include a plurality of known benign execution hashes (referred to as a "white list" of execution hashes) and a plurality of known malicious execution hashes (referred to as a "black list" of execution hashes). Additionally, the execution hash intelligence may include execution hashes that are highly correlated (e.g., identical or substantially similar) to execution hashes associated with boot records being returned by the software agent.

More specifically, besides white list and black list review, the de-duplicator logic may be configured to identify and eliminate repetitive execution hashes associated with the received boot samples corresponding to boot records maintained at the endpoint of a customer network protected by the software agent. It is contemplated that a count may be maintained to monitor the number of repetitive execution hashes. Given the large volume of boot samples that may be analyzed by a centralized bootkit analysis system associated with an entire enterprise network, this deduplication operation is conducted to create a representative (reduced) set of execution hashes and avoid wasted resources in analyzing the number of identical execution hashes.

As a result, each "matching" execution hash (e.g., an execution hash that is identical to or has at least a prescribed level of correlation with another execution hash in the execution hash intelligence) is removed from the set of execution hashes thereby creating a reduced set of execution hashes. The prescribed level of correlation may be a static value or a programmable value to adjust for false-positives / false-negatives experienced by the cyberattack detection system. Also, the results of the comparisons performed by the emulator logic also may be used to update the execution hash intelligence (e.g., number of detections, type of execution hash, etc.).

Thereafter, each of the reduced set of execution hashes may be analyzed by the classifier logic, and based on such analysis, may be determined to be associated with one or more boot samples classified as malicious, suspicious or benign. For instance, a second IOC for detecting a compromised boot system may be determined by the de-duplicator and classifier logic in response to detecting one or more execution hashes within the enterprise network that are unique or uncommon (e.g., less than 5 prior detected hashes), where these execution hashes denote differences in boot instructions from recognized (and expected) execution hashes that may be due to the presence of a bootkit.

Additionally, during simulated processing of the boot samples by the emulator logic, resultant behaviors associated with such simulated processing are identified and logged. The classifier logic may compare the resultant behaviors to behaviors associated with normal or expected OS bootstrapping generated from prior analyses (human and machine) to identify any behavioral deviations. For example, detection of suspicious behaviors resulting from the simulated processing, such as overwriting critical data structures such as an interrupt vector table (IVT), decoding and executing data from disk, suspicious screen outputs from the boot code, and/or modifying certain files or data on the storage device, may be determined by the classifier as malicious behavior denoting a bootkit. The type and/or number of behavioral deviations may operate as a third IOC utilized by the classifier logic for detecting a compromised boot system.

Based on the IOCs described above, the classifier logic determines whether a boot sample is "malicious," based on a weighting and scoring mechanism dependent on any combination of the above-described IOCs having been detected, and if so, the classifier logic signals the reporting logic to issue an alert. Similarly, upon determining that the IOCs identify a boot sample under analysis is benign (i.e., non-malicious), the classifier logic discontinues further analyses associated with the boot sample. However, where the classifier logic determines that the IOCs identify the boot sample as neither "malicious" nor "benign" (i.e., "suspicious"), further analyses may be performed on the boot sample by the classifier logic or other logic within or outside of the bootkit analysis system. Such further analyses may be automated and conducted by another analysis system or may be conducted by a security analyst. Additionally, execution hashes associated with malicious and/or benign boot samples may be stored in the black list and/or white list forming the execution hash intelligence described above. These lists may be utilized, at least in part, by the classifier logic as another IOC in detecting a bootkit, especially any execution hashes that represent boot instructions where such tampering of the instructions or the instruction sequence, by itself, identifies the boot sample as malicious.

Based on the foregoing, embodiments of the disclosure are designed to collect boot records from the network device via a low component to increase reliability of the boot record data. Furthermore, the analysis of the boot records take into account behavioral analyses and, with the emulation logic and de-duplicator logic, provide an ability to analyze thousands or even tens of thousands of boot records in a timely manner without significant costs and resources.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; a controller (network, memory, etc.); an application specific integrated circuit; receiver, transmitter and/or transceiver circuitry; semiconductor memory; combinatorial logic, or combinations of one or more of the above components.

Alternatively, the logic (or component) may be in the form of one or more software modules, such as executable code in the form of an operating system, an executable application, code representing a hardware I/O component, an application programming interface (API), a subroutine, a function, a procedure, an applet, a servlet, a plug-in, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; mass storage that includes (a) non-persistent storage such as volatile memory (e.g., any type of random access memory "RAM"), or (b) persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the logic (or component) may be executable code is stored in persistent storage.

A "network device" may refer to a physical electronic device with network connectivity. Examples of a network device may include, but are not limited or restricted to the following: a server; a router or other signal propagation networking equipment (e.g., a wireless or wired access point); or an endpoint (e.g., a stationary or portable computer including a desktop computer, laptop, electronic reader, netbook or tablet; a smart phone; a video-game console; or wearable technology (e.g., watch phone, etc.)). Alternatively, the network device may refer to a virtual device being a collection of software operating as the network device in cooperation with an operating system (OS).

The "endpoint," defined above, may be a physical or virtual network device equipped with at least an operating system (OS), one or more applications, and a software agent that, upon execution on the endpoint, may operate to identify malicious (or non-malicious) content for use in determining whether the endpoint has been compromised (e.g., currently subjected to a cybersecurity attack). The software agent may be configured to operate on a continuous basis when deployed as daemon software or operate on a noncontinuous basis (e.g., periodic or activated in response to detection of a triggering event). In particular, the "software agent" includes a software module, such as a plug-in for example, that extracts data from the storage device for bootkit analysis.

A "plug-in" generally refers to a software component designed to enhance (add, modify, tune or otherwise configure) a specific functionality or capability to logic such as, for example, the software agent. In one embodiment, the plug-in may be configured to communicate with the software agent through an application program interface (API). For this illustrative embodiment, the plug-in may be configured to collect and analyze information from one or more sources within the network device. This information may include raw data from a storage device, such as extracted data (e.g., bytes of code) from its MBR and/or one or more VBRs. The plug-in can be readily customized or updated without modifying the software agent.

As briefly described above, the term "malware" may be broadly construed as malicious software that can cause a malicious communication or activity that initiates or furthers an attack (hereinafter, "cyberattack"). Malware may prompt or cause unauthorized, unexpected, anomalous, unintended and/or unwanted behaviors (generally "attack-oriented behaviors") or operations constituting a security compromise of information infrastructure. For instance, malware may correspond to a type of malicious computer code that, upon execution and as an illustrative example, takes advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience attack-oriented behaviors. The attack-oriented behaviors may include a communication-based anomaly or an execution-based anomaly, which, for example, could (1) alter the functionality of a network device in an atypical and unauthorized manner; and/or (2) provide unwanted functionality which may be generally acceptable in another context. A "bootkit" is a type of malware that initiates the cyberattack early in the boot cycle of an endpoint.

In certain instances, the terms "compare," "comparing," "comparison," or other tenses thereof generally mean determining if a match (e.g., identical or at least having a prescribed level of correlation) is achieved between two items where one of the items may include a representation of instructions (e.g., a hash value) associated boot code under analysis.

The term "computerized" generally represents that any corresponding operations are conducted by hardware in combination with software and/or firmware. Also, the term "message" may be one or more packets or frames, a file, a command or series of commands, or any collection of bits having the prescribed format. The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1A, a first exemplary block diagram of a cyberattack detection system 100 is shown. For this embodiment, the cyberattack detection system 100 includes a network device (e.g., endpoint) $110_1$, which is implemented with a software agent 120 to detect a cyberattack being attempted on the endpoint $110_1$. Herein, for bootkit detection, the software agent 120 may be configured to collect data stored within a storage device 130 of the endpoint $110_1$ for malware analysis in response to a triggering event that may be periodic (e.g., every boot cycle, at prescribed times during or after business hours, etc.) or aperiodic (e.g., as requested by security personnel, responsive to an update to privileged code in the endpoint $110_1$, etc.). As shown, the storage device 130 may correspond to a hard-disk drive, one or more solid-state devices (SSDs) such as an array of SSDs (e.g., flash devices, etc.), a Universal Serial Bus (USB) mass storage device, or the like.

As further shown in FIG. 1A, a software module 140 (referred to as a "data recovery module") is provided to enhance operability of the software agent 120. The data recovery module 140 may be implemented as a software component of the software agent 120 or as a separate plug-in that is communicatively coupled to the software agent 120. The data recovery module 140 features a driver 150 that is configured to extract data 155 stored within the storage device 130 via a lowest level component 160 within a storage driver stack maintained by the network device $110_1$. The extracted data 155 may be obtained through one or more read messages from the driver 150 to a hardware abstraction layer 165 of the storage device 130 (e.g., a type of controller such as a memory (disk) controller), which is configured to access content from one or more boot records $170_1$-$170_M$ (M≥1) stored in the storage device 130.

More specifically, the driver 150 is configured to directly access the low (e.g., lowest) level software driver 160 within the storage driver stack, such as a software driver in direct communications with the memory controller 165. Via the lowest level software driver 160, the driver 150 may be configured to access stored information (content) within one or more of the boot records $170_1$-$170_M$ (M≥1) maintained by the storage device 130. For example, the driver 150 may conduct one or more read queries to extract data from "M" boot records $170_1$-$170_m$, which may include a Master Boot Record (MBR) 172 and/or one or more Volume Boot Records (VBRs) 174. The extracted data associated with each boot record $170_1$-$170_M$ is referred to as a "boot sample" $157_1$-$157_M$, respectively. By directly accessing the lowest level software driver 160 within the storage driver stack, the driver 150 is able to bypass a remainder of the software drivers forming the storage driver stack (see FIG. 4) that have been "hijacked" by malware, or otherwise may be malicious and configured to intercept data requests.

Upon receipt of the extracted data 155 corresponding to the boot samples $157_1$-$157_M$ from the storage device 130, the software agent 120 provides the boot samples $157_1$-$157_M$ to a bootkit analysis system 180. Herein, for this embodiment of the disclosure, the bootkit analysis system 180 may be implemented as a centralized bootkit analysis system (BAS) as shown. In particular, the bootkit analysis system 180 is configured to receive the boot samples $157_1$-$157_M$ from the network device $110_1$ for analysis as to whether any of the boot samples $157_1$-$157_M$ includes bootkit malware. Additionally, the bootkit analysis system 180 may receive boot samples from other network devices (e.g., network devices $110_2$-$110_N$, where N≥2) that may be utilized to determine IOCs associated with an incoming boot sample (e.g., boot $157_1$) identifying that the boot sample $157_1$ potentially includes bootkit malware.

Herein, the bootkit analysis system 180 may be deployed as (i) a separate, on-premises network device on the enterprise network or (ii) logic within a network device supporting a cloud service provided by a cloud network 190, such as a private cloud network or a public cloud network as shown. Software may be deployed in network devices $110_1$-$110_N$ to extract and provide boot samples to the bootkit analysis system 180 for processing, such as the software agent 120 deployed in network device $110_1$ that, in combination with the data recovery module 140, provides the boot samples $157_1$-$157_M$ to the bootkit analysis system 180. The bootkit analysis system 180 operates to identify IOCs that may signify a presence of bootkit malware within boot records of a monitored network device, such as (1) one or more of the boot samples $157_1$-$157_M$ (e.g., boot record $157_1$) being different from the same data contained in the boot record $170_1$ retrieved from the user space; (2) unique execution hashes or uncommon execution hashes (e.g., execution hashes detected less than 5 times previously) denoting different boot instruction sequences among the network devices $110_1$-$110_N$; and/or (3) behaviors conducted by a particular boot sample $157_1$... or $157_M$ that deviate from normal (or expected) OS bootstrapping.

Figure 1B:
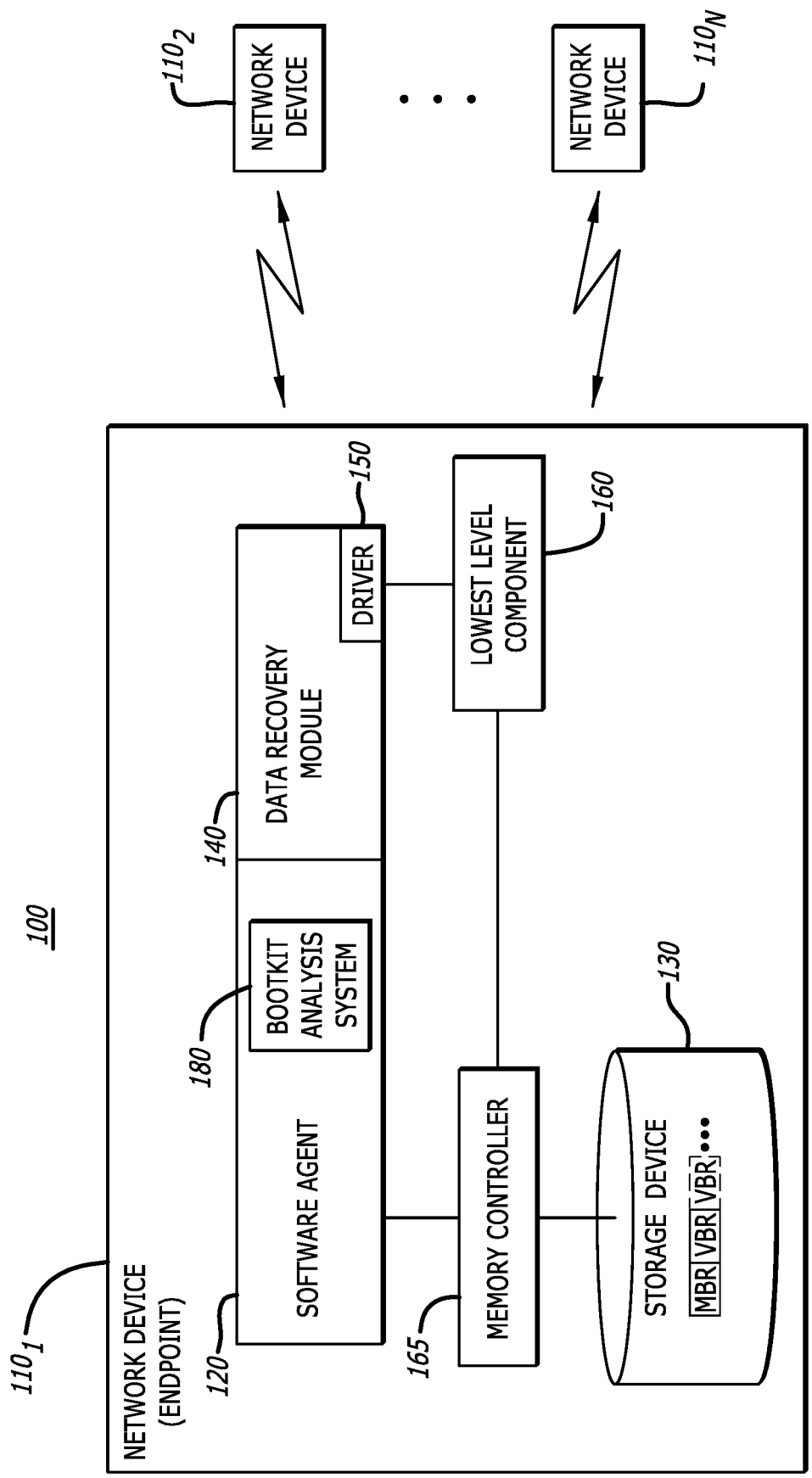
FIG. 1B is a second exemplary block diagram of a cyber-attack detection system deploying the bootkit analysis system deployed local to the network device being monitored.

Referring now to FIG. 1B, a second exemplary block diagram of the cyberattack detection system 100 deploying the bootkit analysis system 180 is shown. In lieu of a centralized deployment, as show in FIG. 1A, the bootkit analysis system 180 may be deployed as part of the software agent 120 installed on the network device $110_1$. The software agent 120 may communicate with other software agents within the network devices $110_1$-$110_N$ to collect information needed for IOC determination. Alternatively, the bootkit analysis system 180 may be a software module that is implemented separately from the software agent 120, but is deployed within the same network device $110_1$. The bootkit analysis system 180 operates to identify IOCs that are used to detect a presence of bootkit malware, as described above.

Figure 2:
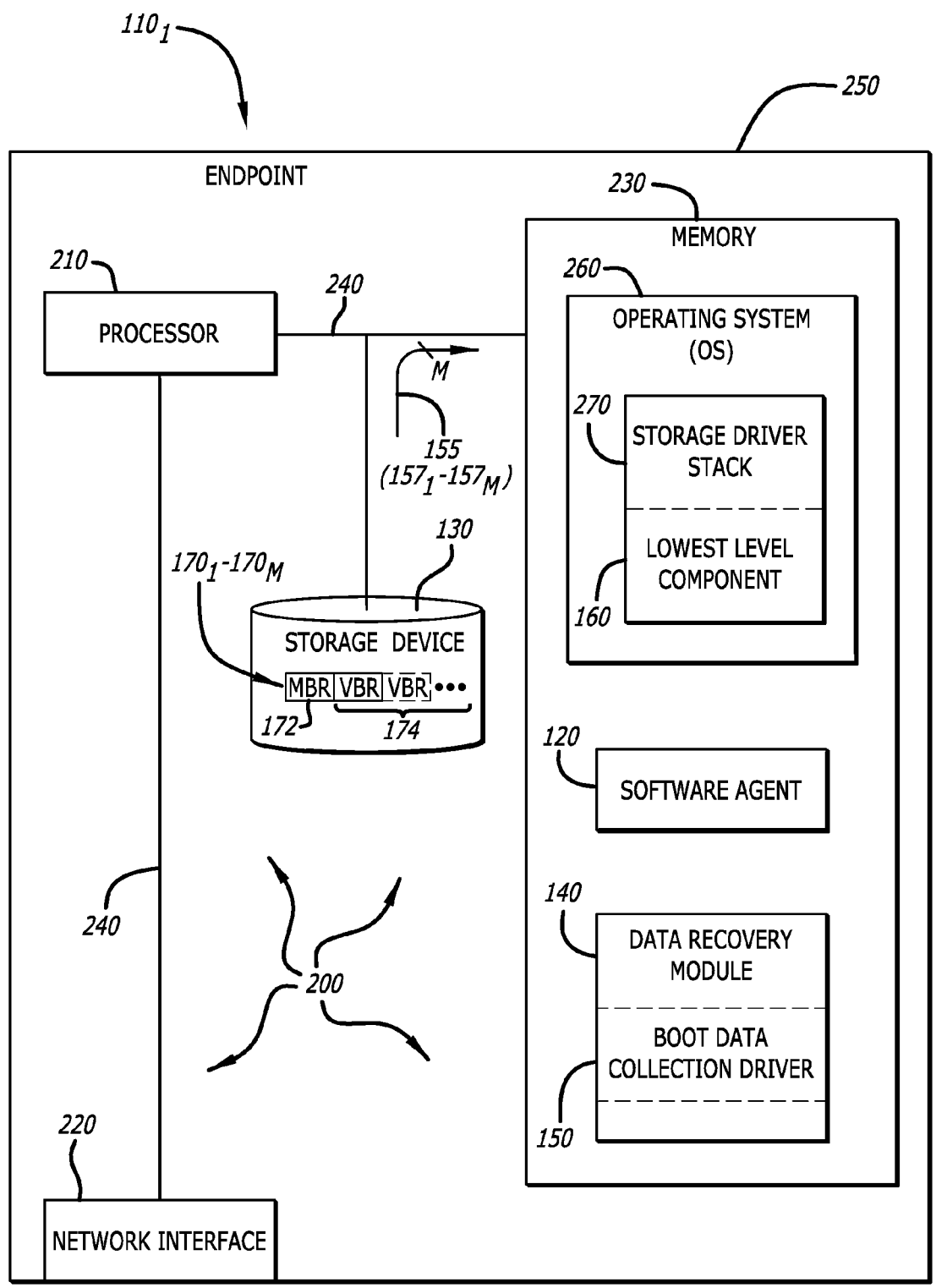
FIG. 2 is an exemplary block diagram of a network device including the software agent and data recovery module of FIG. 1A.
Figure 2:
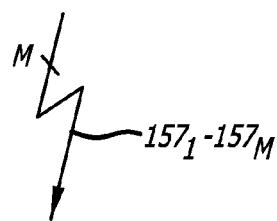

Referring now to FIG. 2, an exemplary embodiment of a logical representation of the network device $110_1$ including the software agent 120 of FIG. 1A is shown. Herein, for this embodiment, the network device $110_1$ operates as an endpoint, including a plurality of components 200, including a processor 210, a network interface 220, a memory 230 and the storage device 130, all of which are communicatively coupled together via a transmission medium 240. As shown, when deployed as a physical device, the components 200 may be at least partially encased in a housing 250, which may be made entirely or partially of a rigid material (e.g., hard plastic, metal, glass, composites, or any combination thereof) that protects these components from environmental conditions.

As shown, the software agent 120 and the data recovery module 140 are stored within the memory 130. The data recovery module 140 includes the driver 150, referred to as the "boot data collection driver" 150, which is configured to extract (raw) data from the storage device 130 while bypassing one or more drivers within the storage driver stack 270 made available by the operating system (OS) 260.

The processor 210 is a multi-purpose, processing component that is configured to execute logic maintained within the memory 230, namely non-transitory storage medium. One example of processor 210 includes an Intel® (x86) central processing unit (CPU) with an instruction set architecture. Alternatively, processor 210 may include another type of CPU, a digital signal processor, an Application Specific Integrated Circuit (ASIC), a field-programmable gate array, or any other hardware component with data processing capability.

The memory 230 may be implemented as a persistent storage, including the software agent 120 with additional functionality provided by the data recovery module 140. The software agent 120, upon execution on the processor 210, operates as a daemon software application by conducting operations of retrieving stored contents within the storage device 130 in response to a triggering event as described above. More specifically, the data recovery module 140 includes the boot data collection driver 150, which is configured to recover the extracted data 155, namely boot samples $157_1$-$157_M$. More specifically, the boot data collection driver 150 accesses the OS 260 of the endpoint $110_1$ to obtain the storage driver stack 270 and determines the lowest level component 160 associated with the stack 270. Thereafter, the boot data collection driver 150 initiates a message to the lowest level component 160 requesting data maintained in one or more storage locations within the storage device 130 that are identified in the query message. For example, the data collection driver 150 may initiate one or more READ messages for stored information within the MBR 172 and/or one or more VBRs 174. The stored information from each of the boot records $170_1$-$170_M$, representing at least part of a corresponding boot sample $157_1$-$157_M$, are subsequently provided from the endpoint $110_1$ to the bootkit analysis system 180.

Figure 3:
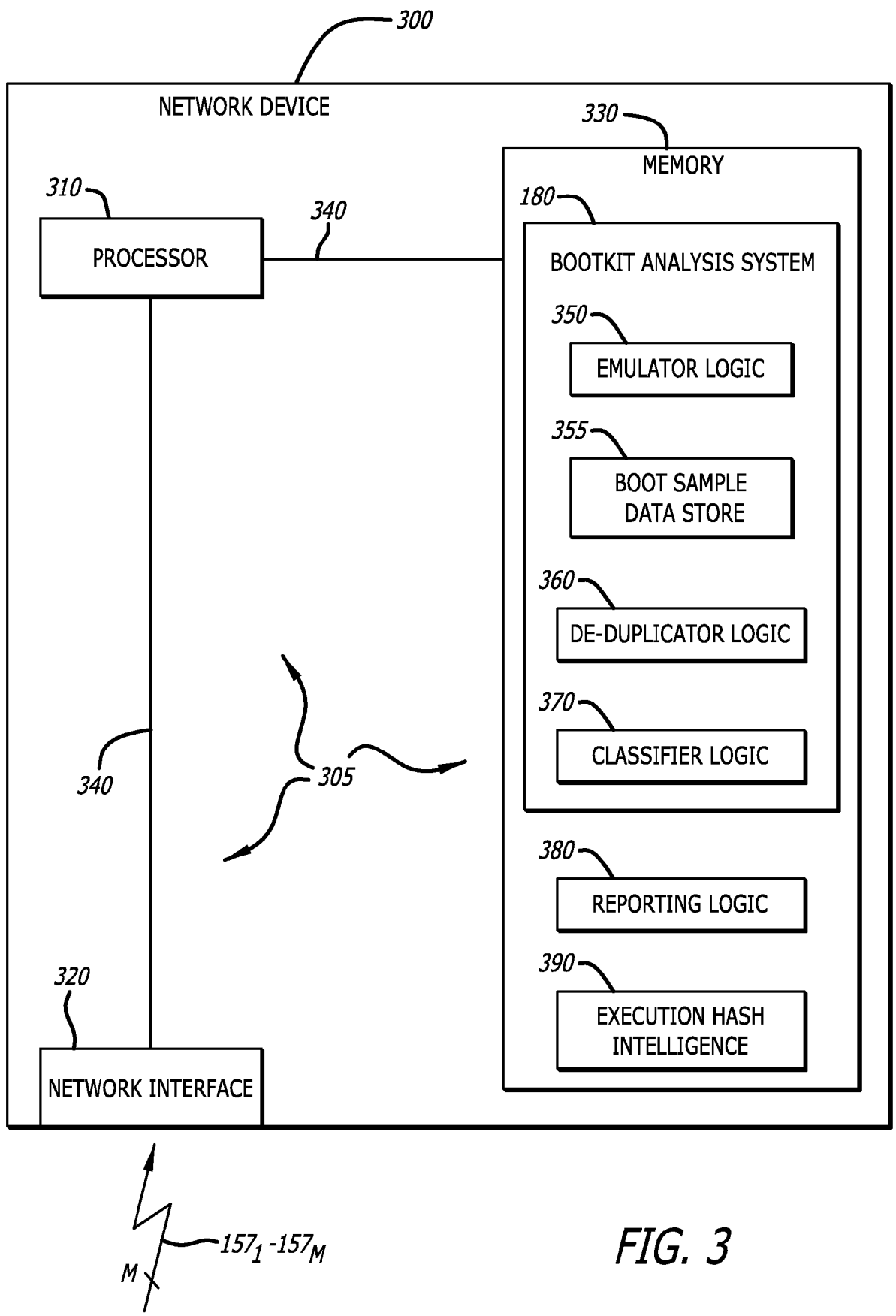
FIG. 3 is an exemplary block diagram of a network device deployed as part of a cloud service and including the bootkit analysis system of FIG. 1A.

Referring to FIG. 3, an exemplary embodiment of a logical representation of a network device 300 deploying the bootkit analysis system 180 of FIG. 1A is shown. Herein, for this embodiment, the network device 300 is deployed as part of a cloud network (e.g., public or private cloud network) and supports a cloud service for bootkit detection. For this embodiment, the network device 300 includes a plurality of components 305, including a processor 310, a network interface 320 and a memory 330, which are communicatively coupled together via a transmission medium 340. As shown, the memory 330 stores (i) the bootkit analysis system 180 including emulator logic 350, a boot sample data store 355, de-duplicator logic 360 and classifier logic 370; and (ii) reporting logic 380. Executive hash intelligence 390 may be accessible and stored therein.

The processor 310 is a multi-purpose, processing component that is configured to execute logic maintained within the bootkit analysis system 180. During execution of certain logic, the bootkit analysis system 180 is configured to receive boot samples $157_1$-$157_M$ from the network device $110_1$, temporarily store the received boot samples $157_1$-$157_M$ in the boot sample data store 355, and modify data within each of the boot samples $157_1$-$157_M$ to produce representative data for analysis. The representative data, referred to as an execution hash (described below), may be used to determine whether a sequence of operations performed in accordance with each boot sample $157_1$... or $157_M$ differs from "normal" bootstrapping operations. Stated differently, the detection of the presence of a bootkit may be based, at least in part, on detection of differences between sequence of operations to be performed in accordance with any of the boot samples $157_1$-$157_M$ and the sequence of operations performed in accordance with "normal" bootstrapping operations.

More specifically, the bootkit analysis system 180 includes the emulator logic 350 that simulates processing of each of the boot samples $157_1$-$157_M$ to determine high-level functionality of each of the boot samples $157_1$-$157_M$. This functionality includes behaviors such as memory accesses, memory reads and writes, and other interrupts. Each of these behaviors may be represented by one or more instructions, such as one or more assembly instructions. The assembly instructions may include, but are not limited or restricted to the following mnemonics: AND (logical "and"), OR (logical "or"), SHL (logical "shift left"), SHR (logical "shift right"), and/or MOV (e.g., logical "move").

During emulation, according to one embodiment of the disclosure, the emulator logic 350 performs a one-way hash operation on the mnemonics of the determined instructions associated with each boot sample (e.g., boot sample $157_1$). The resultant hash value, referred to as an "execution hash," is generated from continued hashing of mnemonics associated with the instructions being determined through the simulated processing of the boot sample $157_1$ by the emulator logic 350. Hence, an execution hash may be generated for each boot sample $157_1$-$157_M$ provided to the bootkit analysis system 180.

As further shown in FIG. 3, the bootkit analysis system 180 further features the de-duplicator logic 360. The de-duplicator logic 360 is configured to (i) receive a set of execution hashes each based on content from one of the boot samples $157_1$-$157_M$ received by the emulator logic 350 and (ii) eliminate execution hashes deemed to be repetitious, namely execution hashes that are not considered unique or uncommon in comparison with previously generated execution hashes 390 (referred to as "execution hash intelligence 390"). The elimination of repetitious execution hashes may involve consideration of execution hashes stored in a black list, white list and prior execution hashes analyzed for the boot samples from a particular software agent for evaluation by the bootkit analysis system 180. The elimination of repetitious execution hashes generates a reduced set of execution hashes and groups the execution hashes, which translates into a saving of processing and storage resources. It is noted that any detected comparisons (e.g., matches) with "malicious" execution hashes may be reported to the classifier 370 (or left as part of the reduced set of execution hashes) or routed to the reporting logic 380 to generate an alert, as described below.

Thereafter, each execution hash of the reduced set of execution hashes is analyzed by the classifier logic 370. Based, at least in part on such analysis, the classifier logic 370 determines whether data associated with the boot samples $157_1$-$157_M$ is malicious, suspicious or benign based on the presence or absence of notable distinctions between each execution hash from the reduced set of execution hashes and certain execution hashes within the execution hash intelligence 390 representative of normal (or expected) bootstrapping operations. The "malicious" or "benign" classification may be based on detected IOCs associated with one or more boot samples, such as matching between a certain execution hash and/or sequences of execution hashes within the reduced set of execution hashes to execution hash(es) within the execution hash intelligence 390 to identify the boot sample(s) $157_1$-$157_M$. When the result is non-determinative, the execution hash is classified as "suspicious."

As described above, one (second) IOC for detecting a compromised boot system may be determined by the de-duplicator logic 360 and the classifier logic 370 in response to detecting one or more execution hashes are unique or uncommon (e.g., less than 5 prior detected hashes), where these execution hashes denote differences in boot instructions from recognized (and expected) execution hashes that may be due to the presence of a bootkit. Additionally, during simulated processing of the boot samples by the emulator logic, resultant behaviors associated with such simulated processing are identified and logged. The classifier logic 370 may compare the resultant behaviors to behaviors associated with normal or expected OS bootstrapping generated from prior analyses (human and machine) to identify any behavioral deviations. For example, overwriting certain data structures such as an interrupt vector table (IVT), decoding and executing data from disk, suspicious screen outputs from the boot code, and/or modifying certain files or data on the storage device, may be determined by the classifier logic 370 as malicious behavior denoting a bootkit. The type and/or number of behavioral deviations may operate as another (second) IOC utilized by the classifier logic for detecting a compromised boot system while deviation between raw boot record data depending on the retrieval path may constitute another (first) IOC that is provided to the classifier as metadata with the boot samples or via a separate communication path.

Where the execution hash is suspicious, where the level of correlation does not meet the correlation threshold in that there are deviations between the execution hash under analysis and the execution hashes within the execution hash intelligence 390, further (and more in-depth) analyses may be performed on the extracted data in contrast to discontinued processing of the benign execution hashes. Where the execution hash is determined to be malicious, however, the classifier logic 370 communicates with the reporting logic 380 to generate an alert that is provided to a security administrator. The "alert" may be a displayable image or other communication to advise the security administrator of a potential bootkit attack. Additionally, malicious execution hashes and/or benign execution hashes may be stored in a black list and/or white list, respectively. These lists may be utilized, at least in part, by the classifier logic 370.

III. Exemplary Logical Layout

Figure 4:
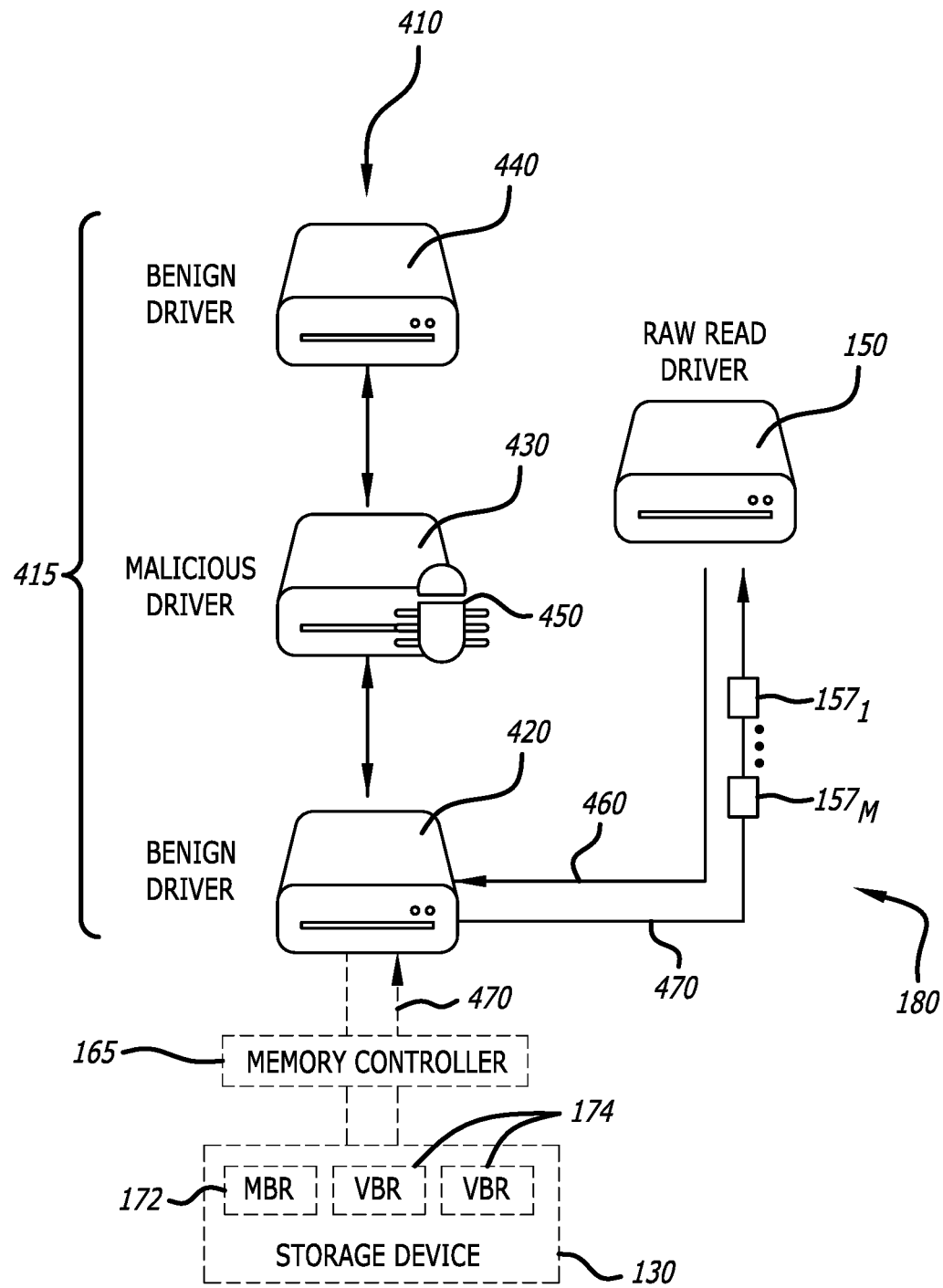
FIG. 4 is an exemplary block diagram of a logical representation of the operability of the boot data collection driver operating with the software agent of FIG. 2.

Referring now to FIG. 4, an exemplary block diagram of a logical representation of the operability of the boot data collection driver 150 operating with the software agent 120 of FIG. 2 is shown. Herein, the boot data collection driver 150 receives one or more instructions from the software agent (not shown) to retrieve raw data from the addressable storage device 130. Upon receipt of the instruction(s) to retrieve data from the storage device 130, the boot data collection driver 150 initiates a request to an OS (e.g., Windows® OS) of the network device (e.g., an API call) for information 415 associated with the storage driver stack 410. Returned by the OS of the network device, the stack information 415, which is visually represented in the figure as an array of drivers expanding from a lowest level of the storage driver stack 410 (e.g., lowest storage driver 420) up to software driver 440. The storage driver stack 410 illustrates an order of communication starting with the software driver 440 and proceeding to the lowest storage driver 420 via an intermediary software driver 430. As shown, the intermediary software driver 430 is malicious, including bootkit malware 450.

Herein, based on the stack information 415, the boot data collection driver 150 determines a lowest level component associated with the storage driver stack 410, such as the lowest storage driver 420 as illustrated. It is contemplated, however, that a stack representation of other software components, besides software drivers per se, may be used in bypassing secondary software components for direct access to the storage device 130. In the Windows® OS architecture, information associated with the storage driver stack 410 is available through access via a published API.

Thereafter, the boot data collection driver 150 initiates a request 460 to the lowest storage driver 420. The request 460 may correspond to one or more READ request messages for data maintained in one or more selected storage locations within the storage device 130. For example, the boot data collection driver 150 may initiate a first READ request 460 for data bytes within the MBR 172 (e.g., boot sample $157_1$) via the memory controller 165 and/or other READ requests 460 for data bytes within the VBR(s) 174 (e.g., boot sample $157_2$...) maintained in the storage device 130. These data bytes, namely extracted data 470 including boot samples $157_1$-$157_M$, are returned to the boot data collection driver 150 via the lowest storage driver 420. Thereafter, by the boot data collection driver 150 retrieving the boot samples $157_1$-$157_M$ directly via the lowest storage device 420 in lieu of the high-level storage device 440, the boot data collection driver 150 is able to bypass a remainder of the software drivers, including the malicious storage driver 430 configured to intercept data requests. Hence, this provides improved bootkit detection over conventional techniques.

Figure 5:
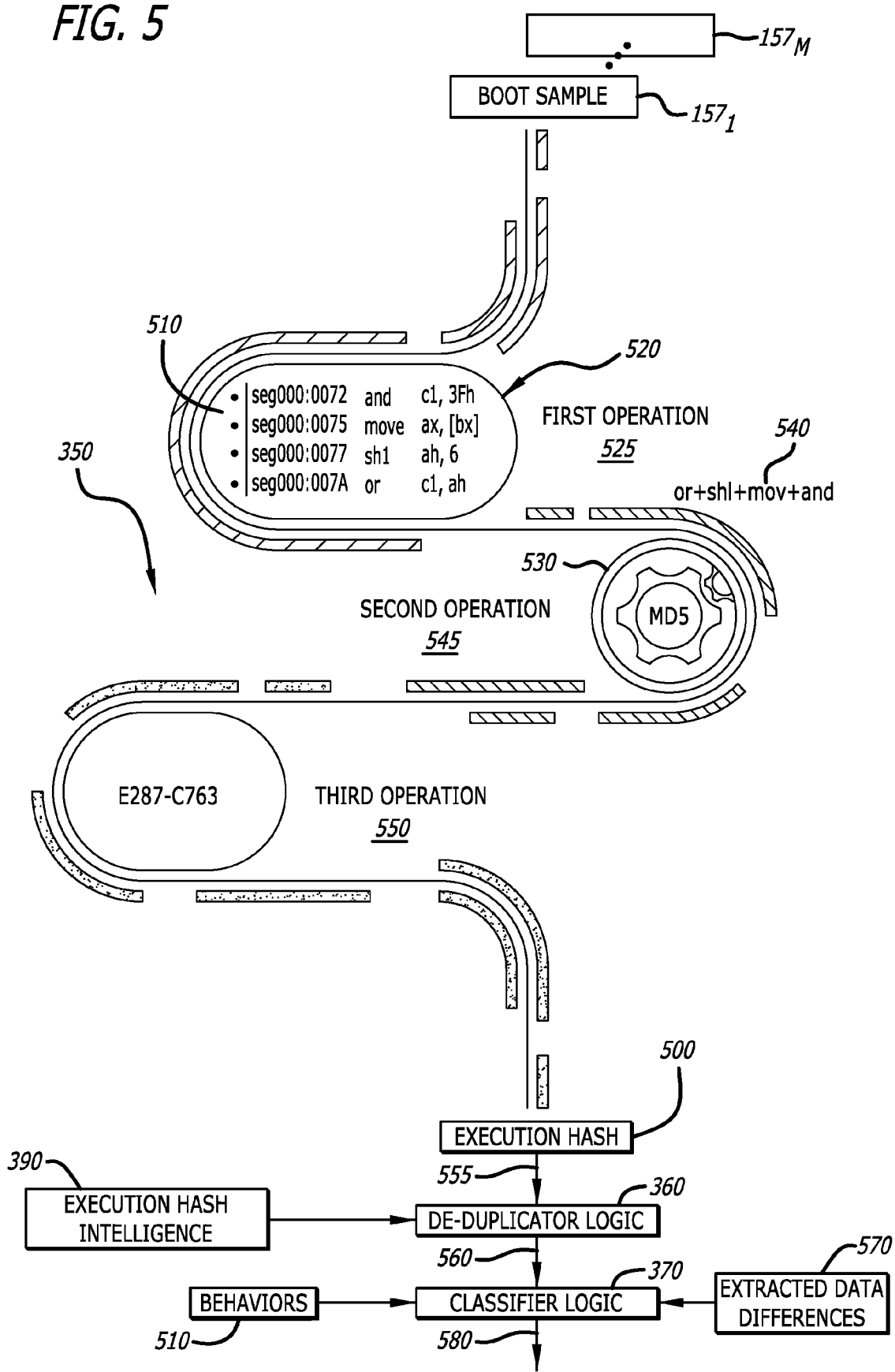
FIG. 5 is an exemplary embodiment of a logical representation of operations conducted by emulator logic of the bootkit analysis system of FIG. 3 in generating an execution hash for analysis by de-duplicator logic and classifier logic of the bootkit analysis system of FIG. 2.

Referring to FIG. 5, an exemplary embodiment of a logical representation of the operations conducted by emulator logic 350 of the bootkit analysis system of FIG. 3 is shown, where the emulator logic 350 is configured to generate an execution hash 500 for each received boot samples $157_1$-$157_M$ (e.g., boot sample 157 of FIGS. 1A-3) based on stored information (e.g., extracted data) retrieved from boot records within a storage device under analysis. Herein, the emulator logic 350 receives each of the boot samples $157_1$-$157_M$ and, for each boot samples $157_1$-$157_M$ (e.g., boot sample $157_1$), the emulator logic 350 captures high-level functionality during simulated processing of the boot sample $157_1$, where the high-level functionality includes behaviors 510 such as one or more memory accesses, disk reads and writes, and other interrupts. Each of these behaviors 510 may be represented by a series of instructions 520 (see first operation 525). The series of instructions 520 may include, but are not limited or restricted to assembly instruction(s) such as AND (logical "and"), OR (logical "or"), SHL (logical "shift left"), SHR (logical "shift right"), and/or MOV (e.g., logical "move").

Thereafter, according to one embodiment of the disclosure, the emulator logic 350 performs a one-way hash operation 530 on the mnemonics 540 (e.g., AND, OR, SHL, SHR, MOV, etc.) associated with the series of instructions 520, which is representative of the ordered instructions executed during a boot cycle (see second operation 545). This ordered hashing operation of the mnemonics 540 for the series of instructions 520 being emulated continues for extracted data for the particular boot sample $157_1$. Upon completion of the emulation and hashing of the mnemonics 540 for the series of instructions 520 pertaining to the boot sample $157_1$, which may correspond to a particular boot record such as MBR 172 for example, the emulator logic 350 has produced the execution hash 500 for that particular boot record (see third operation 550).

Alternatively, in lieu of performing the one-way hash operation 530 on the mnemonics 540, it is contemplated that the emulator logic 350 may log the behaviors 510 and may perform a hash operation on the behaviors 510 themselves to produce the execution hash 500. In particular, the emulator logic 350 may perform hash operations on the series of behaviors 510 chronologically (i.e., in order of occurrence). As another example, some of the behaviors 510 may be excluded (filtered) from the hash operations (disregarded) where such behaviors are normally benign and their limited presence may lead to a greater result of false positive detections.

The de-duplicator logic 360 compares the execution hash 500 based on boot sample $157_1$ and other execution hashes based on boot samples $157_2$-$157_M$ generated by the emulator logic 350, namely a set of execution hashes 555, against a plurality of execution hashes associated with previously detected boot samples (e.g., malicious or benign execution hashes in the execution hash intelligence 390). Based on this comparison, the de-duplicator logic 360 eliminates repetitious execution hashes to formulate a reduced set of execution hashes 560 for analysis by the classifier logic 370. Hence, these unique or uncommon execution hashes are more manageable in identifying boot code that is potentially malicious, such as operating as a bootkit.

As suspicious activity executed by bootkits can vary widely, instead of generating detection signatures for individual malware samples, the bootkit analysis system 180 is configured to identify deviations (in code structure and behavior) from normal OS bootstrapping as another IOC. To enable this analysis, the behaviors 510 produced during simulated processing of content within each of the boot samples $157_1$-$157_M$ may also be considered by the classifier 370 in classifying any of the reduced set of execution hashes 560 as malicious, benign or suspicious as described above. Also, as another IOC, information associated with one of the boot samples $157_1$-$157_M$ being different than data retrieved from the particular boot record via the user space (referred to as "extracted data differences 570 may be considered by the classifier 370. The classification result 580 may be provided to reporting logic (not shown) to issue an alert, as described above.

Figure 6:
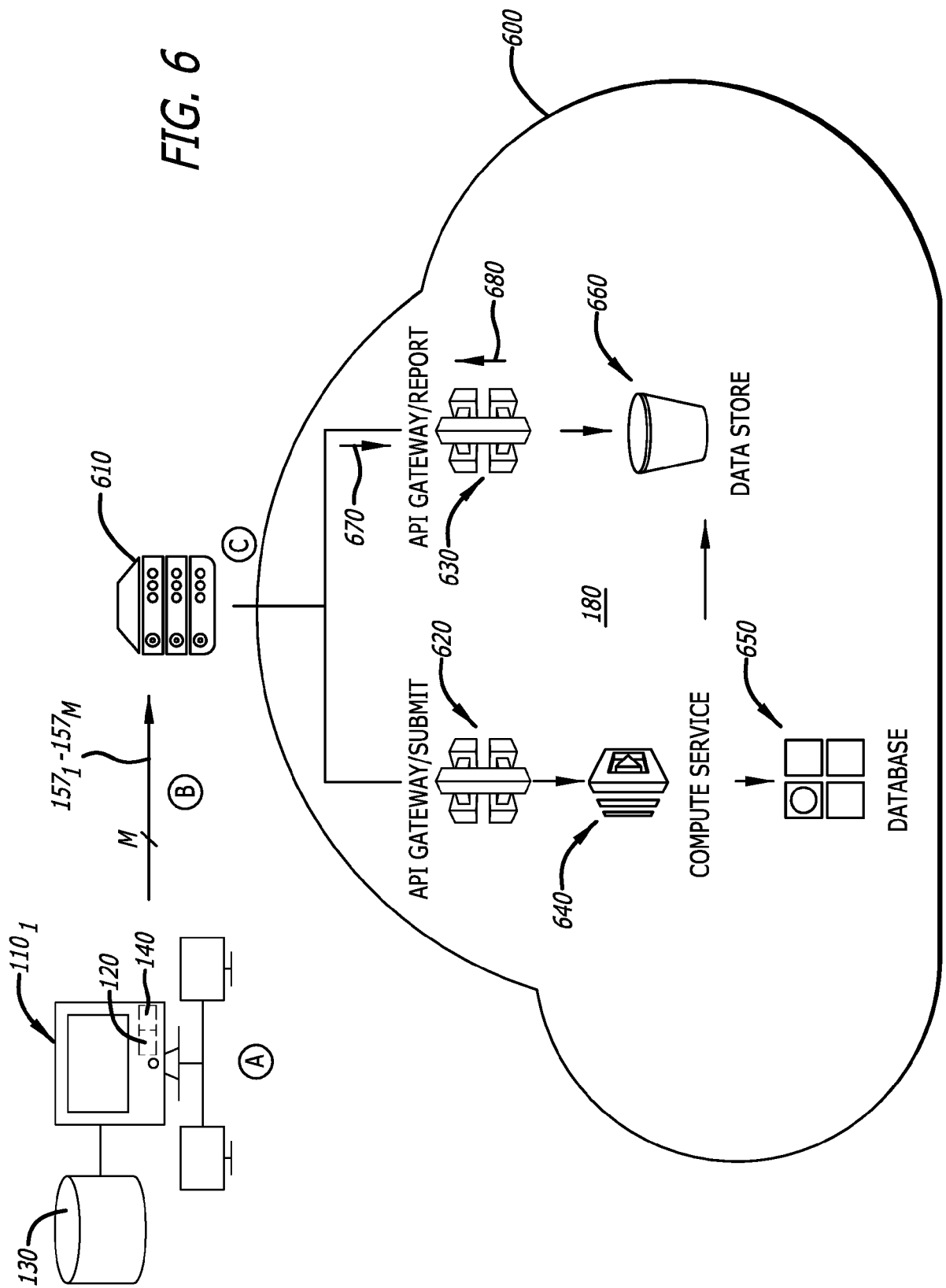
FIG. 6 is an illustrative embodiment of the operations conducted by the bootkit analysis system FIG. 3.

Referring now to FIG. 6, an illustrative embodiment of the operations conducted by the bootkit analysis system 180 of FIG. 2 is shown. An endpoint $110_1$ deploys the software agent 120 including the data recovery module 140 that is configured to automatically gain access to prescribed storage locations within the storage device 130 of the endpoint $110_1$ via a lowest driver of the storage driver stack, as described in FIG. 4 (see operation A). These prescribed storage locations may be directed to a plurality of boot records, including the master boot record (MBR) and/or one or more volume boot records (VBRs) within the storage device 130. For each of these boot records, the data recovery module 140 may be configured to extract data from that boot record thereby obtaining boot samples $157_1$-$157_M$ for the boot records.

After receipt of the boot samples $157_1$-$157_M$, the endpoint $110_1$ provides the boot samples $157_1$-$157_M$ to a cloud network 600 for bootkit analysis (operation B). As shown, the boot samples $157_1$-$157_M$ may be provided to an intermediary server 610 for record management and subsequent submission to the cloud network 600. Besides the boot samples 157₁-157ₘ, the intermediary server 610 may also receive metadata associated with the boot samples (e.g., name of the corresponding boot record, identifier of the software agent, and/or an identifier of the endpoint such as a media access control "MAC" address or an Internet Protocol "IP" address). According to one embodiment of the disclosure, the server 610 tracks such metadata items and sends only the boot samples 157₁-157ₘ to the cloud bootkit analysis system 180 According to another embodiment of the disclosure, the cloud bootkit analysis system 180 may receive the metadata of the boot samples 157₁-157ₘ to assist in enriching alerts with additional context information regarding a potential cyberattack based on prior analyses.

For boot record submission and analysis, each of the boot samples 157₁-157ₘ associated with each boot record maintained in the storage device 130 of the endpoint 110₁ is provided to the bootkit analysis system 180 (operation C). As shown, the intermediary server 610 may access the bootkit analysis system 180 via a RESTful API interface 620. According to one embodiment of the disclosure, where the cloud network 600 may be an Amazon Web Service (AWS®), the RESTful API interface 620 is an AWS® API Gateway being a managed service that aids developers to create, publish, maintain, monitor and/or secure APIs, which is exposed and accessible to receive and validate the submitted boot samples 157₁-157ₘ.

Herein, the bootkit analysis system 180 is scalable and configured with the emulator logic 350 of FIG. 3, for example, included as part of a compute service 640 that runs code in response to events and automatically manages the compute resources required by that code. An example of the compute service may include "analysis Lambda™" component 640 for the AWS® architecture. While the Amazon® AWS® public cloud network deployment is described, it is contemplated that the bootkit analysis system 180 may be deployed as part of analogous components within other public cloud networks (e.g., Microsoft® Azure®, Google® Cloud, etc.) or as part of software components within a private cloud network.

Herein, the emulator logic is configured to (i) simulate processing of each incoming boot sample received via AWS® API Gateway 620 to determine instructions associated with data forming that boot sample, and (ii) perform hash operations on information associated with the determined instructions, such as the mnemonics for example, to produce an execution hash for each targeted boot record. The analysis Lambda™ component 640 is further configured with the de-duplicator logic to group different boot samples together based on boot instruction sequencing and remove repetitive execution hashes to reduce a total number of execution hashes for classification. Hence, the unique or uncommon execution hashes are maintained for analysis by the classifier logic.

Thereafter, record metadata (e.g., execution hash, etc.) is generated, collected and stored in a database 650 being part of the cloud network 600 such as Dynamo dB for the AWS® architecture for example. The database 650 may be accessed by the classifier logic, deployed within the analysis Lambda™ component 640, in determining whether information within a boot record is malicious. Additionally, the analysis Lambda™ component 640 features the reporting logic, which generates reports for each boot record that is stored in a predetermined data store 660 within the cloud network 600 (represented as "S3" for the AWS® architecture).

The intermediary server 610 may issue a query request message 670 for reports associated with particular endpoints or particular boot samples via another AWS® RESTful API interface, referred to as API Gateway/Report 630. In response, reports 680 associated with such boot samples or endpoints are gathered from the data store (S3) 660 and returned to the intermediary server 610, where the reports are made available to one or more authorized sources that prompted the query request message 670.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A network device for detecting a potential bootkit malware, comprising:
a processor; and
a non-transitory storage medium communicatively coupled to the processor, the non-transitory storage medium comprises a bootkit analysis system for detecting the bootkit malware based on analysis of a plurality of boot samples, the bootkit analysis system including
emulator logic that, upon execution by the processor, simulates processing of each of the plurality of boot samples received to determine high-level functionality of each of the plurality of boot samples and to perform hash operations on the high-level functionality for each of the plurality of boot samples to produce a plurality of execution hashes each generated from a hash operation on mnemonic of instructions for a boot sample of the plurality of boot samples,
de-duplicator logic that, upon execution by the processor, receives the plurality of execution hashes each based on content from one of the plurality of boot samples received by the emulator logic and eliminates execution hashes deemed to be repetitious to produce a reduced set of execution hashes, and
classifier logic that, upon execution by the processor, determines whether data associated with the plurality of boot samples is malicious, suspicious or benign based on a presence or absence of notable distinctions between each execution hash of the plurality of execution hashes for the reduced set of execution hashes and a plurality of execution hashes representative of normal or expected bootstrapping operations.

2. The network device of claim 1, wherein the non-transitory storage medium further comprising:
a boot sample data store to store the plurality of boot samples for processing by the emulator logic.

3. The network device of claim 1, wherein the non-transitory storage medium further comprising reporting logic that, when executed by the processor, generates an alert that is provided to a security administrator, the alert includes a displayable image to advise the security administrator of a potential bootkit attack.

4. The network device of claim 1, wherein the emulator logic simulates processing of each of the plurality of boot samples received to determine the high-level functionality being mnemonic of instructions corresponding to a plurality of logical instructions, the plurality of logical instructions comprises any combination of two or more instructions from a plurality of instructions including an AND instruction, an OR instruction, a SHR (shift right) instruction, a SHL (shift left) instruction, and a MOV (move) instruction.

5. The network device of claim 1, wherein the plurality of execution hashes representative of normal bootstrapping operations corresponds to an execution hash intelligence gathered from a plurality of network devices including the network device.

6. The network device of claim 1, wherein the de-duplicator logic, upon execution by the processor, is further configured to (i) perform a deduplication operation on an execution hash of the reduced set of execution hashes to determine a level of correlation between the execution hash and prior known execution hashes and (ii) provide the execution hash to the classifier logic to analyze deviations in at least behavior of a first boot sample of the plurality of boot samples from normal OS bootstrapping.

7. A non-transitory storage medium including software that, when executed by one or more processors, performs operations on a plurality of boot samples associated with an electronic device to determine whether the electronic device includes bootkit malware, the non-transitory computer storage medium comprising:
   emulator logic that, upon execution by the one or more processors, simulates processing of each of the plurality of boot samples to determine high-level functionality of each of the plurality of boot samples and to perform operations on the high-level functionality for each of the plurality of boot samples to produce a set of data representations each associated with one of the plurality of boot samples, wherein each data representation constitutes a hash operation on mnemonic of instructions for each boot sample of the plurality of boot samples;
   de-duplicator logic that, upon execution by the one or more processors, receives the plurality of data representations each based on content from one of the plurality of boot samples received by the emulator logic and eliminates a data representation of the plurality of data representations deemed to be repetitious to produce a reduced set of data representations; and
   classifier logic that, upon execution by the one or more processors, determines whether data associated with the plurality of boot samples is malicious, suspicious or benign based on a presence or absence of notable distinctions between each data representation of the reduced set of data representations and a plurality of data representation associated with normal or expected bootstrapping operations.

8. The non-transitory storage medium of claim 7, wherein each data representation corresponds to an execution hash.

9. The non-transitory storage medium of claim 8 further comprising reporting logic that, when executed by the one or more processors, generates an alert being a message including a displayable image to identify a potential bootkit attack.

10. The non-transitory storage medium of claim 8, wherein the emulator logic to simulate processing of each of the plurality of boot samples received to determine the high-level functionality being a plurality of logical instructions, the plurality of logical instructions comprises any combination of two or more instructions from a plurality of instructions including an AND instruction, an OR instruction, a SHR (shift right) instruction, a SHL (shift left) instruction, and a MOV (move) instruction.

11. The non-transitory storage medium of claim 8, wherein the plurality of execution hashes representative of normal or expected bootstrapping operations corresponds to an execution hash intelligence gathered from a plurality of network devices.

12. A computerized method for detecting a potential bootkit malware, comprising:
   simulating processing, by emulator logic executed by a processor, of each of the plurality of boot samples received to determine high-level functionality of each of the plurality of boot samples and to perform hash operations on the high-level functionality for each of the plurality of boot samples to produce a plurality of execution hashes, each execution hash of the plurality of execution hashes is generated from a hash operation on mnemonic of instructions for a boot sample of the plurality of boot samples,
   receiving, by de-duplicator logic executed by the processor, the plurality of execution hashes, each execution hash of the plurality of execution hashes is based on content from one of the plurality of boot samples received by the emulator logic;
   eliminating, by the de-duplicator logic, one or more execution hashes of the plurality of execution hashes deemed to be repetitious to produce a reduced set of execution hashes; and
   determining, by classifier logic executed by the processor, whether data associated with the plurality of boot samples is malicious, suspicious or benign based on a presence or absence of notable distinctions between each execution hash of the plurality of execution hashes for the reduced set of execution hashes and a plurality of execution hashes representative of normal or expected bootstrapping operations.

13. The computerized method of claim 12 further comprising:
   storing the plurality of boot samples for processing by the emulator logic.

14. The computerized method of claim 12 further comprising:
   generating, by reporting logic executed by the processor, an alert that is provided to a security administrator, the alert may be a displayable image to advise the security administrator of a potential bootkit attack.

15. The computerized method of claim 12, wherein mnemonic of instructions corresponding to a plurality of logical instructions, the plurality of logical instructions comprises any combination of two or more instructions from a plurality of instructions including an AND instruction, an OR instruction, a SHR (shift right) instruction, a SHL (shift left) instruction, and a MOV (move) instruction.

16. The computerized method of claim 12, wherein the plurality of execution hashes representative of normal bootstrapping operations corresponds to an execution hash intelligence gathered from a plurality of network devices including the network device.

* * * * *